United States Patent [19]
Weber et al.

[11] Patent Number: 5,249,559
[45] Date of Patent: Oct. 5, 1993

[54] METHOD FOR IDLE SPEED COMPENSATION DUE TO AIR CONDITIONER OPERATION

[75] Inventors: Gregory T. Weber, Commerce Township, Oakland County; Richard K. Moote, Ann Arbor; Terry R. Gutermuth, St. Clair Shores; James R. Tamm, Ann Arbor, all of Mich.

[73] Assignee: Chrysler Corporation, Highland Park, Mich.

[21] Appl. No.: 996,468

[22] Filed: Dec. 24, 1992

[51] Int. Cl.5 .............................................. F02M 3/00
[52] U.S. Cl. ...................................................... 123/339
[58] Field of Search ....................... 62/323, 133, 228.1; 123/339, 418, 585; 364/431.07; 290/40 C

[56] References Cited
U.S. PATENT DOCUMENTS

| | | | |
|---|---|---|---|
| 4,452,201 | 6/1984 | Mazur et al. | 123/585 |
| 4,719,573 | 1/1988 | Kissel et al. | 364/431.07 |
| 5,133,319 | 7/1992 | Ikeda et al. | 123/339 |
| 5,153,446 | 10/1992 | Shimomura | 123/339 |
| 5,163,399 | 11/1992 | Bolander et al. | 123/339 |
| 5,172,665 | 12/1992 | Kuroda | 123/339 |
| 5,172,666 | 12/1992 | Nonaka | 123/339 |
| 5,191,865 | 3/1993 | Minamitani et al. | 123/339 |
| 5,199,272 | 4/1993 | Yamanaka et al. | 62/133 |

*Primary Examiner*—Raymond A. Nelli
*Attorney, Agent, or Firm*—Beverly M. Bunting

[57] ABSTRACT

Many internal combustion engines have an auxiliary means for controlling airflow into the engine at idle, such as an Automatic Idle Speed (AIS) motor to compensate for changing load requirements. A method is disclosed for controlling the AIS motor and in turn engine idle speed to compensate for changing loads due to the operation of the air conditioner. The method recognizes the relationship between ambient temperature and pressures generated within the air conditioning compressor and the compensation necessary to maintain a smooth idle speed. The method also utilizes adaptive learning to relate a "looked up" of the air conditioner to the current value of auxiliary air flow required by a warmed up engine.

10 Claims, 4 Drawing Sheets

METHOD FOR IDLE SPEED COMPENSATION DUE TO AIR CONDITIONER OPERATION

BACKGROUND OF THE INVENTION

Field of the Invention

The present invention relates generally to control of engine idle speed, and more particularly to a method for controlling engine idle speed due to changing load conditions especially as related to the engagement and/or disengagement of the air conditioning system.

Description of the Related Art

Most conventional engines have an auxiliary means for controlling throttle and/or airflow into the engine at idle to compensate for variations in engine RPM resulting from changing power requirements or loads such as that due to the operation of accessories like air conditioning, power steering or anti-lock brakes. This additional control is accomplished either through a movable throttle stop or with an air bypass valve and results in the desired constant idle speed.

A typical air bypass valve, also referred to as an automatic idle speed (AIS) motor, representative of the related art is disclosed and hereby expressly incorporated by reference in commonly assigned U.S. Pat. No. 4,452,201 entitled, "Automatic Idle Speed Actuator Valve."

The ability of the AIS motor to respond to the application of a load may be affected by external factors such as the time delay between a change in airflow and a corresponding change in idle speed, or varying ambient temperatures, as will be explained below.

Commonly assigned U.S. Pat. No., 4,719,573, entitled "Programmed Spark Scatter Control Method For Quick Response To Changing Load Conditions" hereby expressly incorporated by reference is one strategy for utilizing spark advance control to compensate for changing engine loads until the AIS motor is able to respond.

Another method found in the art for compensating for the operation of the air conditioner is to increase the auxiliary airflow controlled by the AIS motor a fixed amount when the air conditioner is engaged. However, one problem with this method is that pressure within the air conditioning compressor is directly related to ambient temperature and can result in engine speed undershoot when the air conditioner is engaged at high ambient temperatures, due to high loads being generated and engine speed overshoots at low ambient temperatures due to lower loads being generated.

The AIS motor is controlled by a microprocessor contained in the engine control unit (ECU). The ECU receives inputs from sensors, may contain sensors, is able to process information received from such sensors and is also able to send out instructions to selectively adjust various parameters. The ECU stores and processes information in two types of memory, non-erasable read only memory (ROM) and erasable random access memory (RAM).

The ECU has adaptive learning capability, a process whereby values stored in the ECU can be updated according to current operating conditions. Values representing some parameter of the vehicle operating system can be initialized in RAM memory with predetermined values. "Learning" takes place as these values are continuously updated as engine operating conditions vary, and can be "looked up" and used by the ECU when similar operating conditions are subsequently encountered.

SUMMARY OF THE INVENTION

The present invention provides a method for minimizing fluctuations in engine speed resulting from the operation of the air conditioner at idle. Immediately after the vehicle is started, the ECU reads the ambient air temperature, and uses this value to "look up" an AIS step corresponding to a change in auxiliary airflow to compensate for the load due to the engagement of the air conditioner at this particular temperature from a table stored in RAM memory. This value is stored in a memory location in the ECU for later use.

It has been observed that the load of the air conditioning compressor varies directly in proportion to the pressure within the a/c compressor. Further, there is a linear relationship between the pressure in the compressor and ambient temperature. For example, as ambient temperature increases, compressor pressure increases and the more auxiliary air flow required to compensate and maintain a smooth idle speed.

If the engine is at idle, the method determines the status of the air conditioner: ready to be engaged, ready to be disengaged, or already on. If a signal has been sent to engage the air conditioner, the ECU instructs the AIS motor to increase auxiliary airflow a predetermined amount to compensate for the engagement of the cooling fan, and then engages the cooling fan. The ECU then instructs the AIS motor to further increase auxiliary airflow by an amount representing the compensation required to overcome the peak load generated as the air conditioning compressor is engaged, prior to engagement of the air conditioner.

If a signal has been sent to disengage the air conditioner, the ECU instructs the AIS motor to reduce the auxiliary airflow by a predetermined amount to prevent a sharp rise and fall in engine speed as the air conditioner is disengaged. After the AIS motor has completed its movement, the air conditioner is disengaged.

If the air conditioner is already on and the engine is warmed up, through adaptive learning the ECU compares the current value representing auxiliary airflow to the "looked up" value of auxiliary airflow required to compensate for the air conditioner previously stored in RAM memory, and updates the value stored in RAM memory in the direction of current air flow requirements.

An advantage of the present invention is that it recognizes the relationships between AIS compensation, operation of the air conditioner, and ambient air temperature in order to reduce or eliminate any air conditioner induced engine speed fluctuations or dips at varying ambient temperature.

It is one object of this invention to eliminate fluctuations in engine speed at idle resulting from changes in operating status of the air conditioner.

It is still another object of this invention to provide a method for controlling the AIS motor to compensate for changing operation of the air conditioner.

It is yet another object of this invention to relate ambient temperature to the amount of auxiliary air flow required to overcome pressure variations in the air conditioning compressor.

It is a further object of this invention to use adaptive learning to relate the "looked up" AIS value of auxiliary air flow required to compensate for operation of the air conditioner to the current amount of auxiliary air flow after the engine is warmed up.

Other objects, feature and advantages of the present invention will become more fully apparent from the following description, in light of the accompanying drawings.

DESCRIPTION OF THE PREFERRED EMBODIMENT

Figure 1:
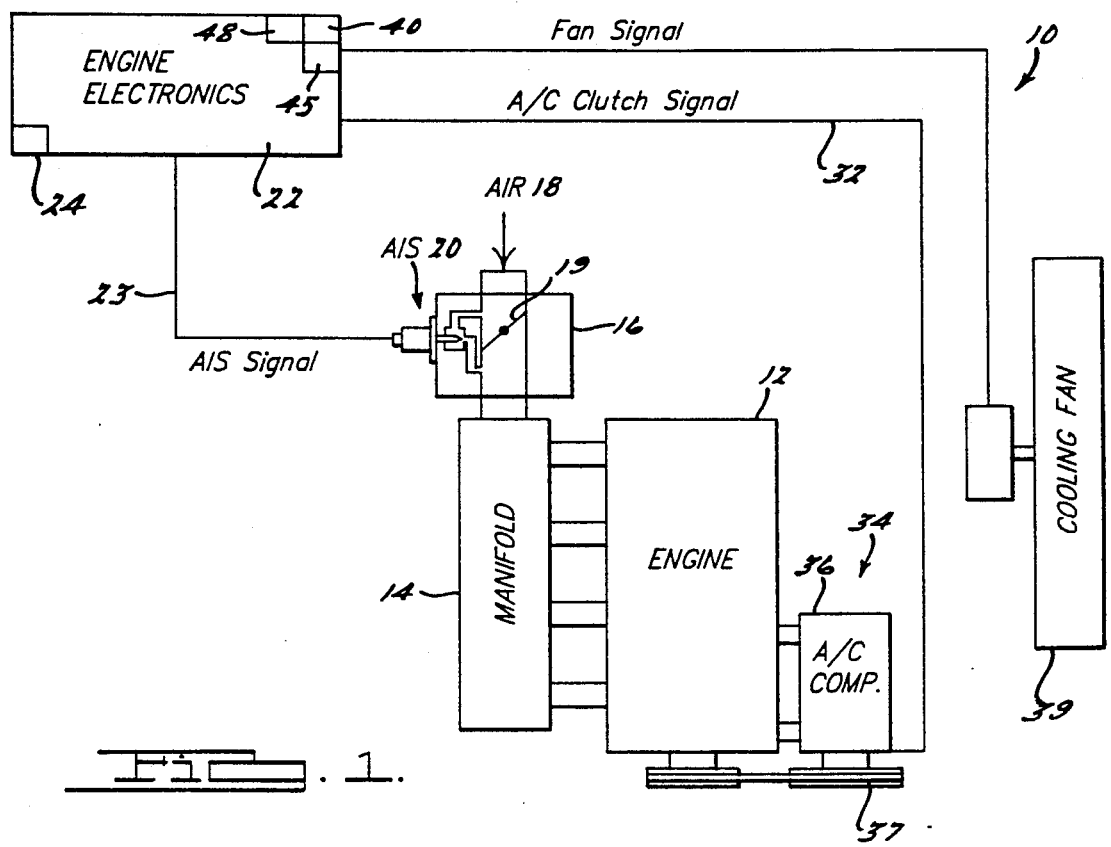
FIG. 1 is a functional block diagram of the engine and related control apparatus.

Referring to FIG. 1, the engine and related control apparatus 10 intended for a motor vehicle is shown. The system includes an internal combustion engine 12 capable of operating on a mixture of air 18 and fuel (not shown). The fuel and air enter the engine 12 through a fuel actuating means, such as a throttle body 16. Air is flow is controlled by an actuating means such as a throttle blade 19 within the throttle body 16. The fuel and air 18 are mixed and dispersed into the various engine cylinders (not shown but well known in the art) through a manifold 14 mounted on the engine 12.

When the engine 12 is at idle, it may be desirous to utilize an automatic idle speed air bypass actuator that causes a predetermined amount of auxiliary air 21 to bypass the throttle blade in response to a signal 23 from a microprocessor based engine controller 22 or ECU. The addition or subtraction of auxiliary air 21 regulates engine idle speed in response to changes in engine 12 load resulting from operation of systems such as the air conditioner 34. Such air bypass actuators are well known in the art. In the preferred embodiment, an automatic idle speed (AIS) motor 20 is used to control the amount of auxiliary air 21 flow. The AIS motor 20 may comprise of an actuator Valve 26 and a motor 28 to drive the valve 26 between an open and closed position and effectively act as a "fine" motor control in addition to the "coarse" control provided by the throttle blade 19. In the preferred embodiment the motor 28 is of the type well known in the art as a Stepper motor.

Figure 1A:
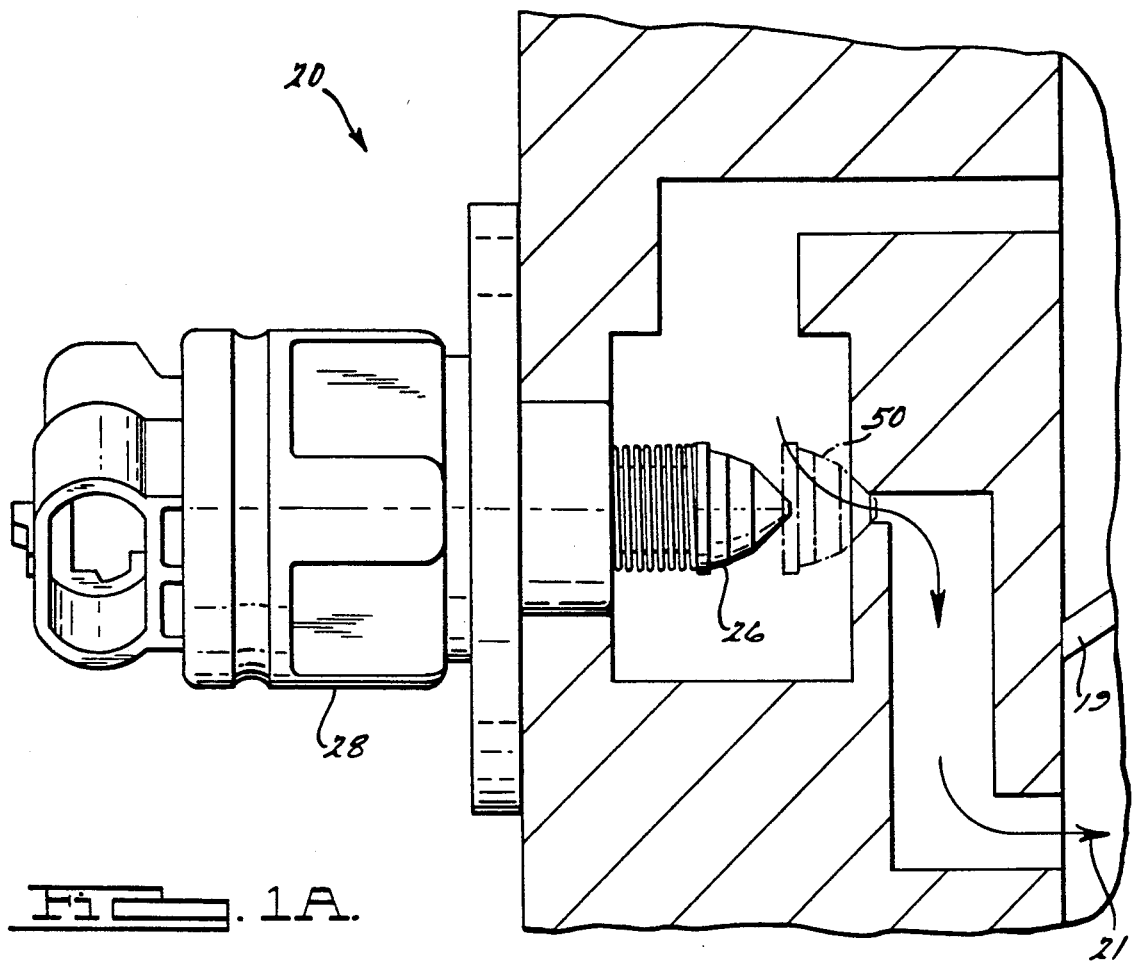
FIG. 1a is a partial cut-away view of an AIS motor to illustrate how auxiliary air flow is varied.

FIG. 1a shows an example of a typical AIS motor 20 in further detail to demonstrate how auxiliary air 21 flow is modified. The flow of auxiliary air 21 is represented by arrows.

Figure 1B:
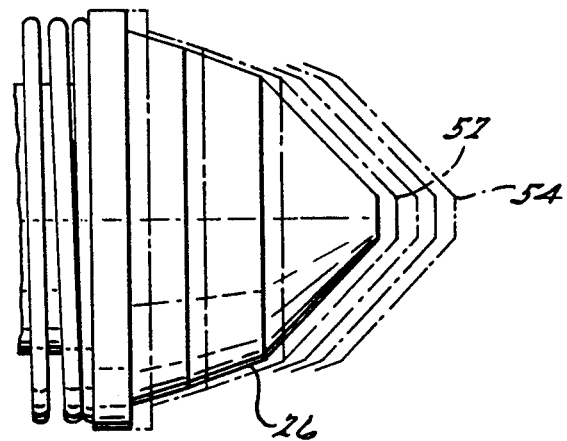
FIG. 1b is a partial view representative of the movement of the actuator valve.

The AIS position 50 refers to the physical position of the valve 26: open, closed, or at some point in between, for allowing discrete amounts of auxiliary air 21 flow ranging from 0% to 100% into the engine 12. The greater the AIS position 50, the greater the amount of auxiliary air 21 flow. The range from 0-100 % is broken down into steps 52. As shown in FIG. 1b, each step 52 represents a discrete change in airflow due to movement of the actuator valve 26. AIS kick 54 refers to a programmable number of steps 52 the motor 28 is instructed by the ECU 22 to move the valve 26 resulting in a new AIS position 50. Other types of AIS motors provide analog openings instead of the indexed steps described above. Such a motor is described in U.S. Pat. No. 4,452,201 which has been specifically incorporated by reference.

In the preferred embodiment, a method is provided for smoothing out spikes in engine 12 idle speed resulting from operation of the air conditioner 34. As shown in FIG. 1, the air conditioner's 34 primary components include a compressor 36, a clutch 37, and a cooling fan 39. The compressor 36 receives a signal 32 from the ECU 22 directing it to engage, or disengage the air conditioner 34.

Figure 2:
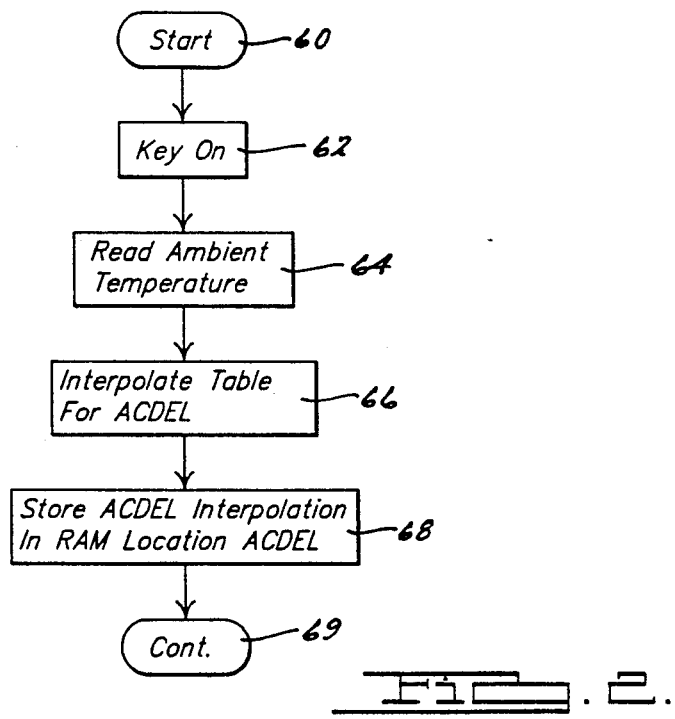
FIG. 2 is a functional block diagram illustrating the steps in deriving a desired AIS position required to compensate for an air conditioning load at the current ambient temperature.

FIG. 2 is a flowchart of the steps used to derive an AIS position required to compensate for an air conditioning load during steady state idle conditions at the current ambient temperature. The method begins in block 60 and continues to block 62 where is called for immediately after the engine 12 is started. The method progresses to block 64 and ambient temperature is read and stored in the ECU 22. Ambient temperature can be obtained by a means for determining ambient temperature, however in the preferred embodiment an ambient temperature sensor 24 is located within the ECU 22.

Figure 4:
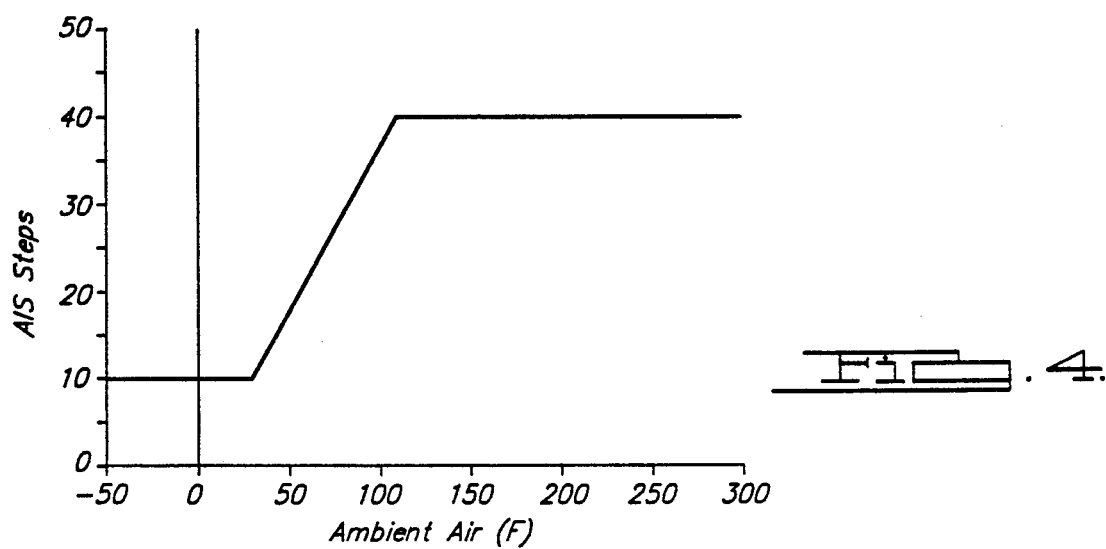
FIG. 4 is a graph representing ambient air temperature versus a predetermined AIS step change to compensate for the operation of the air conditioner.

The method then proceeds to block 66 where the graph shown in FIG. 4 of ambient air temperature versus a predetermined AIS step change to compensate for an air conditioning load during steady state idle conditions is interpolated by the ECU 22 to establish a representative initial AIS kick referred to as AIS delta or ACDEL 40. The x-axis shows a range of ambient air temperatures, and the y-axis shows the AIS step change necessary to compensate for an air conditioning load during steady state idle conditions. The curve is merely representative of the approximate relationship between ambient temperature and AIS step change to compensate for an air conditioning load and is derived from empirical data. The slope of the curve will change depending on factors such as engine size, vehicle weight, and accessories, etc.

Returning to FIG. 2 and to block 68, ACDEL 40 is stored in an erasable memory location of the same name within the ECU 22 in this example. In block 69, control is returned back to the ECU 22 to execute other tasks.

Figure 3:
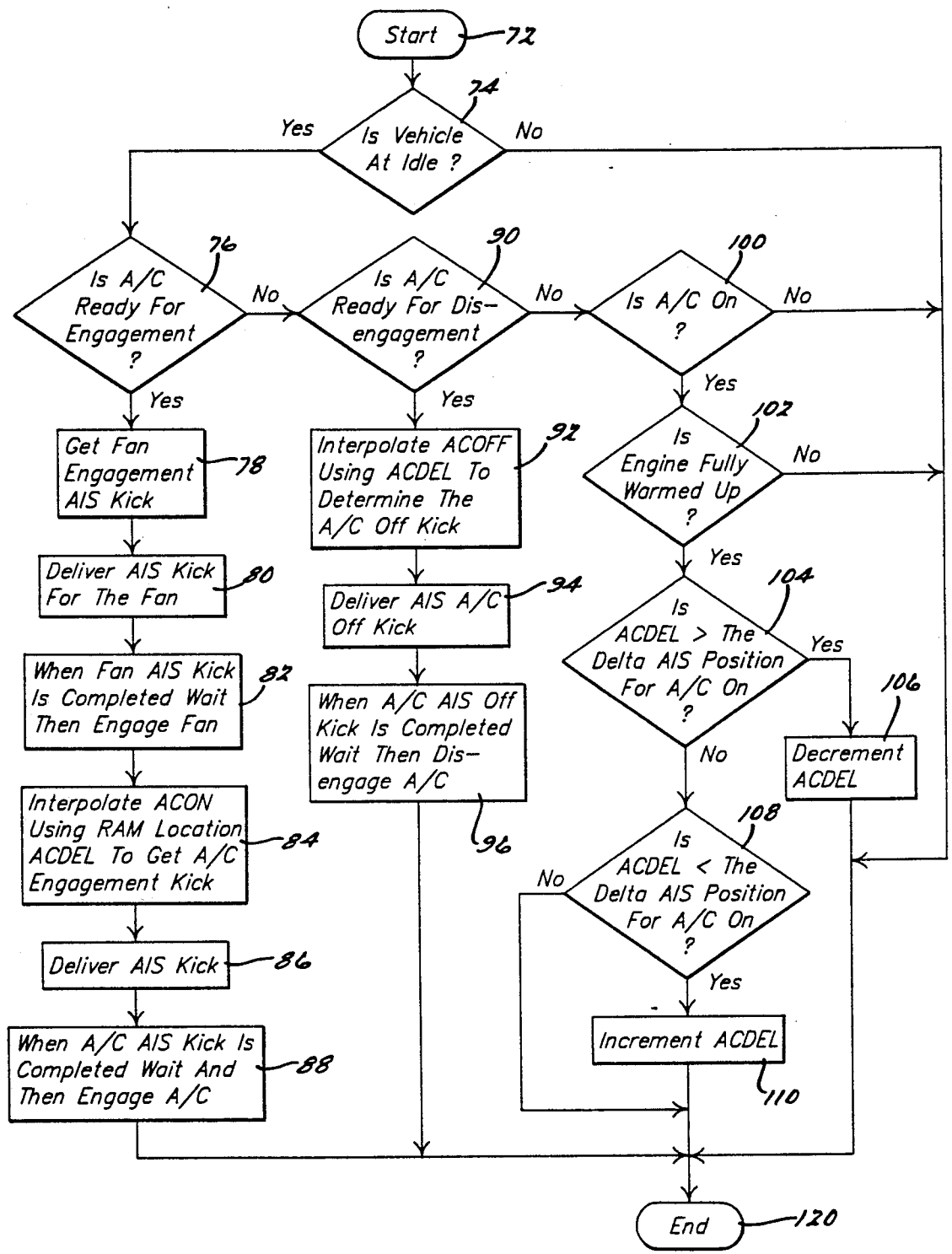
FIG. 3 is a functional block diagram illustrating the steps in determining the operating status of the air conditioner and modifying the AIS position accordingly.

Referring now to FIG. 3, the steps for determining the operating status of the air conditioning system 34 and modifying the AIS position 50 accordingly is shown. The method begins in Block 72 after being called for by the ECU 22 on a periodic basis. The method proceeds to block 74, where it is determined whether the engine 12 is operating at idle. If the engine 12 is not at idle, the method proceeds to block 120 where control is returned back to the ECU 22 to execute other tasks.

If the engine 12 is operating at idle, the method proceeds to block 76 where it is determined whether the air conditioner 34 is ready for engagement. If the air conditioner 34 is ready for engagement, the method moves to block 78. In block 78, the AIS position 50 is modified to adjust for the engagement of the cooling fan 39 by looking up a predetermined AIS kick for engaging the cooling fan 39. The means for determining this kick are not germane to this invention. In block so, the ECU 22 instructs the AIS motor 20 to deliver this AIS kick. In block 82, after the new AIS position 50 is attained, and after waiting a predetermined delay period, the fan 39 is engaged.

Figure 5:
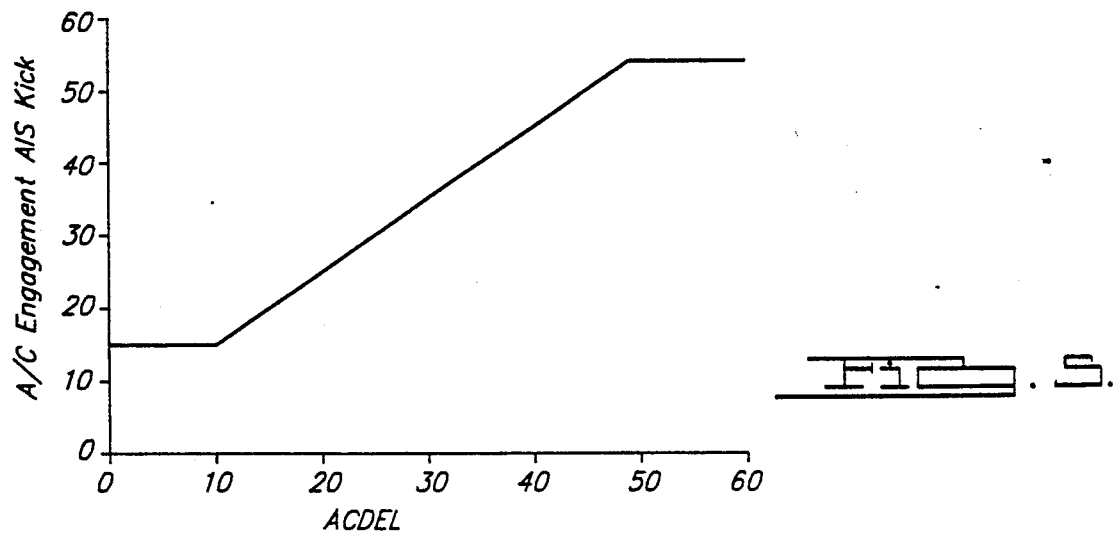
FIG. 5 is a graph representing incremental auxiliary airflow to compensate for air conditioner engagement.

Continuing to block 84, the graph of FIG. 5 of incremental auxiliary airflow to compensate for engagement of the air conditioner 34 is interpolated to obtain the air conditioning engagement AIS kick referred to and stored in ECU 22 memory location ACON 48 in this example. The x-axis is a range of AIS steps representing ACDEL 40, and the y-axis is a range of AIS steps representing ACON 48. The curve in FIG. 5 is merely representative of the approximate relationship between the number of AIS steps to compensate for the air conditioner for a fully warmed up engine at idle and the AIS step change to overcome the engagement of the air conditioner and is based on empirical data. The slope of the curve will change depending on factors such as engine size, vehicle weight, and accessories, etc. The ECU 22 interpolates the curve using the value stored in ACDEL 40 to obtain ACON 48.

In block 86, the AIS motor 20 moves the valve 26 to a new AIS position 50 by the AIS kick stored in ACON 48. Proceeding to block 88, after the new AIS position 50 has been attained, and is engaged. The method proceeds to block 120.

Returning back to block 76, if the air conditioner 34 is not ready for engagement, the method proceeds to block 90 where it is determined whether the air conditioner 34 is ready for disengagement. If the air conditioner 34 is not ready for disengagement, the method proceeds to block 100 where it is determined whether the air conditioner 34 is already engaged.

If the air conditioner 34 is ready for disengagement, the method proceeds to block 92. In block 92 the AIS kick for disengaging the air conditioning system, referred to and stored in ECU 22 memory location ACOFF 45 in this example is determined from interpolating the graph shown in FIG. 6 of decremental auxiliary airflow to compensate for disengagement of the air conditioning system. The x-axis of FIG. 6 is a predetermined range of AIS steps representing ACDEL 40, and the y-axis is a range of AIS steps to compensate for disengaging the air conditioning system, ACOFF 45.

Figure 6:
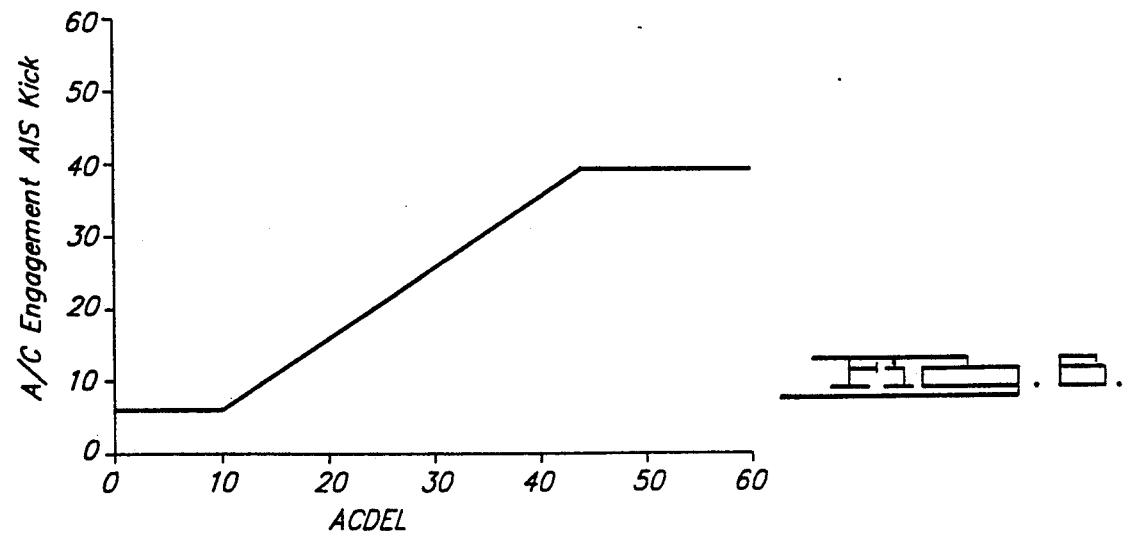
FIG. 6 is a graph representing decremental auxiliary airflow to compensate for disengagement of the air conditioner.

The curve of FIG. 6 is merely representative of the approximate relationship between the number of AIS steps 52 to compensate for the air conditioner for a fully warmed up engine 12 at idle and the AIS step 52 change to compensate for the disengagement of the air conditioner based on empirical data. The slope of the curve will change depending on factors such as engine 12 size, vehicle weight, and accessories, etc. The ECU 22 interpolates the curve utilizing the value stored in ACDEL 40 to determine ACOFF 45.

Returning back to FIG. 3, the method moves to block 94, where the AIS motor 20 moves the valve 26 to a new AIS position 50 according to the AIS kick stored in ACOFF 45. The method proceeds to block 96. After the new AIS position 50 has been attained, the ECU 22 waits a delay period and sends out an instruction to disengage the air conditioner 34. The method proceeds to block 120.

Returning back to block 100 it is determined whether the air conditioner 34 is on. If the air conditioner 34 is not on, the method proceeds to block 120.

Returning to Block 100, if the air Conditioner 34 is turned on, the method proceeds to block 102 where it is determined if the engine 12 is fully warmed up. If the engine 12 is not fully warmed up, the method proceeds to block 120.

If the engine 12 is fully warmed up, that is, the desired operating conditions have been reached, the method moves to block 104 where the method goes through a series of steps to adaptively update the value initially stored in ACDEL 40. The auxiliary air 21 flow is continuously monitored and varied to compensate for factors such as engine speed and load that are constantly changing. The instantaneous AIS position 50 is referred to and stored in ECU 22 memory location AISDELT 48 in this example. At the same time, the ECU 22 is continuously learning the amount of auxiliary air 21 required for a particular operating condition. When that condition is subsequently encountered, the ECU 22 is able to look up the previously determined AIS kick 54 and instruct the AIS motor 20 to move the valve 26 correspondingly.

The adaptive learning begins in block 104 where it determined whether the value stored in ACDEL 40 is greater than the value stored in AISDELT 48. If ACDEL 40 is greater than AISDELT 48, the method proceeds to block 106 Where the value stored in ACDEL 40 is decremented a predetermined amount to effect a decrease the AIS kick so that the idle speed is maintained. The method then branches to block 120.

If ACDEL 40 is not greater than AISDELT 48, then the method moves to block 108 In black 108 it is determined whether the value contained in ACDEL 40 is less than the value stored in AISDELT 48. If ACDEL 40 is not less than AISDELT 48, the method proceeds to block 120. If ACDEL 40 is less than AISDELT 48, the method proceeds to block 110. In block 110 the value stored in the ACDEL 40 is incremented a predetermined amount to effect an increase in auxiliary air 21 flow to maintain idle speed. The method then branches to block 120.

In block 120, the method ends and the ECU 22 is free to execute other tasks, returning to block 72 only as called for.

It should be understood that while this invention has been discussed in connection with one particular example, those skilled in the art will appreciate that other modifications can be made without departing from the spirit of this invention after studying the specification, drawings and the following claims.

We claim:

1. In a vehicle having an internal combustion engine with a fuel actuating means; an automatic idle speed air bypass control means (AIS means) having a valve means for varying auxiliary air flow by a discrete amount (AIS kick); and a known position of the valve means (AIS position); working in conjunction with an engine control unit (ECU) having an erasable memory, and adaptive memory capability; an air conditioner and a fan; a means for determining ambient temperature; a method for controlling engine idle speed due to a changing load resulting o from operation of the air conditioner, the method comprising the steps of:

deriving an initial AIS kick to compensate for an air conditioner load;

storing a value representing initial AIS kick in a memory location in the ECU;

checking whether an engine is operating at idle;

ending said method, if said engine is not operating at idle;

checking the operating status of an air conditioner, if said engine is operating at idle;

deriving an AIS kick for engaging a fan from a set of values stored in a memory location in the ECU, moving an AIS means to a new AIS position by said value for AIS kick for engaging a fan, turning said fan on, deriving an AIS kick for engaging said air conditioner from a set of values stored in a memory location in the ECU, moving said AIS means to a new AIS position by said value of AIS kick for engaging said air conditioner, and turning said air conditioner on, if said air conditioner is ready for engagement;

deriving an AIS kick for disengaging said air conditioner from a set of values stored in a memory location in the ECU, moving said AIS means to a new AIS position by said value of AIS kick for disengaging said air conditioner, and disengaging said air conditioner, if said air conditioner is ready for disengagement;

checking if said engine is warmed up, if said air conditioner is already engaged;

ending said method, if said engine is not warmed up; and updating said value representing said initial AIS kick stored in said memory location in the ECU and ending said method, if said engine is warmed up.

2. The method of claim 1, wherein the step of deriving an initial AIS kick further comprises:

checking a current ambient temperature using a means for determining ambient temperature;

deriving an initial AIS kick using the current ambient temperature from a set of values stored in a memory location in the ECU.

3. The method of claim 1, wherein the step of updating a value representing initial AIS kick comprises:

determining whether said value representing initial AIS kick is greater than a value representing a current AIS position for a warmed up engine;

decrementing said value representing initial AIS kick if said value representing initial AIS kick is greater than said value representing current AIS position for a warmed up engine; and incrementing said value representing initial AIS kick if said value representing initial AIS kick is less than said value representing current AIS position for a warmed up engine.

4. The method of claim 1, including the step of waiting a predetermined period before turning said fan on.

5. The method of claim 1, including the step of waiting a predetermined period before turning said air conditioner on.

6. The method of claim 1, including the step of waiting a predetermined delay period before turning said air conditioner off.

7. In a vehicle having an internal combustion engine with a fuel actuating means; an automatic idle speed air bypass control means (AIS means) having a valve means for varying auxiliary air flow by a discrete amount (AIS kick); and a known position of the valve means (AIS position); working in conjunction with an engine control unit (ECU) having an erasable memory, and adaptive memory capability; an air conditioner and a fan; a means for sensing ambient temperature; a method for controlling engine idle speed due to a changing load resulting from operation of the air conditioner, the method comprising the steps of:

checking a current ambient temperature using a means for determining ambient temperature;

deriving an initial AIS kick using the current ambient temperature from a set of values stored in a memory location in an ECU;

storing a value representing initial AIS kick in a memory location in the ECU;

checking whether an engine is operating at idle;

ending said method, if said engine is not operating at idle;

checking the operating status of an air conditioner, if said engine is operating at idle;

deriving an AIS kick for engaging a fan from a set of values stored in a memory location in the ECU, moving an AIS means to a new AIS position by said value for AIS kick for engaging a fan, turning said fan on, deriving an AIS kick for engaging said air conditioner from a set of values stored in a memory location in the ECU, moving said AIS means to a new AIS position by said value of AIS kick for engaging said air conditioner, and turning said air conditioner on, if said air conditioner is ready for engagement;

deriving an AIS kick for disengaging said air conditioner from a set of values stored in a memory location in the ECU, moving said AIS means to a new AIS position by said value of AIS kick for disengaging said air conditioner, and disengaging said air conditioner, if said air conditioner is ready for disengagement;

checking if said engine is warmed up, if said air conditioner is already engaged;

ending said method, if said engine is not warmed up;

determining whether said value representing initial AIS kick is greater than a value representing a current AIS position for a warmed up engine;

decrementing said value representing initial AIS kick if said value representing initial AIS kick is greater than said value representing current AIS position for a warmed up engine; and incrementing said value representing initial AIS kick if said value representing initial AIS kick is less than said value representing current AIS position for a warmed up engine; and ending said method, if said engine is warmed up.

8. The method of claim 7, including the step of waiting a predetermined period before turning said fan on.

9. The method of claim 7, including the step of waiting a predetermined period before turning said air conditioner on.

10. The method of claim 7, including the step of waiting a predetermined period before turning said air conditioner off.

* * * * *